Aug. 19, 1930.  E. L. ENGELHARDT  1,773,526
TRANSMISSION
Filed May 20, 1929   3 Sheets-Sheet 1

Aug. 19, 1930.  E. L ENGELHARDT  1,773,526
TRANSMISSION
Filed May 20, 1929   3 Sheets-Sheet 3

Patented Aug. 19, 1930

1,773,526

UNITED STATES PATENT OFFICE

ELMER L. ENGELHARDT, OF DENVER, COLORADO

TRANSMISSION

Application filed May 20, 1929. Serial No. 364,586.

This invention relates to planetary eccentric transmissions and more particularly to an improvement in that type of transmission wherein sun and orbit gears are engaged by an annular compound gear constituting the planet gear.

The primary object of the invention is to provide a transmission wherein the guide member for the gears is a compound unit having important bearing connections in a plane with the gears, thus avoiding side strains, holding the gears in more perfect alignment and eliminating to a greater degree resultant noises and wear.

A further object of the invention is to simplify construction of planetary eccentric transmissions.

These and other objects I attain by the construction shown in the accompanying drawings wherein I have shown a preferred embodiment of my invention and wherein:—

Figure 1:
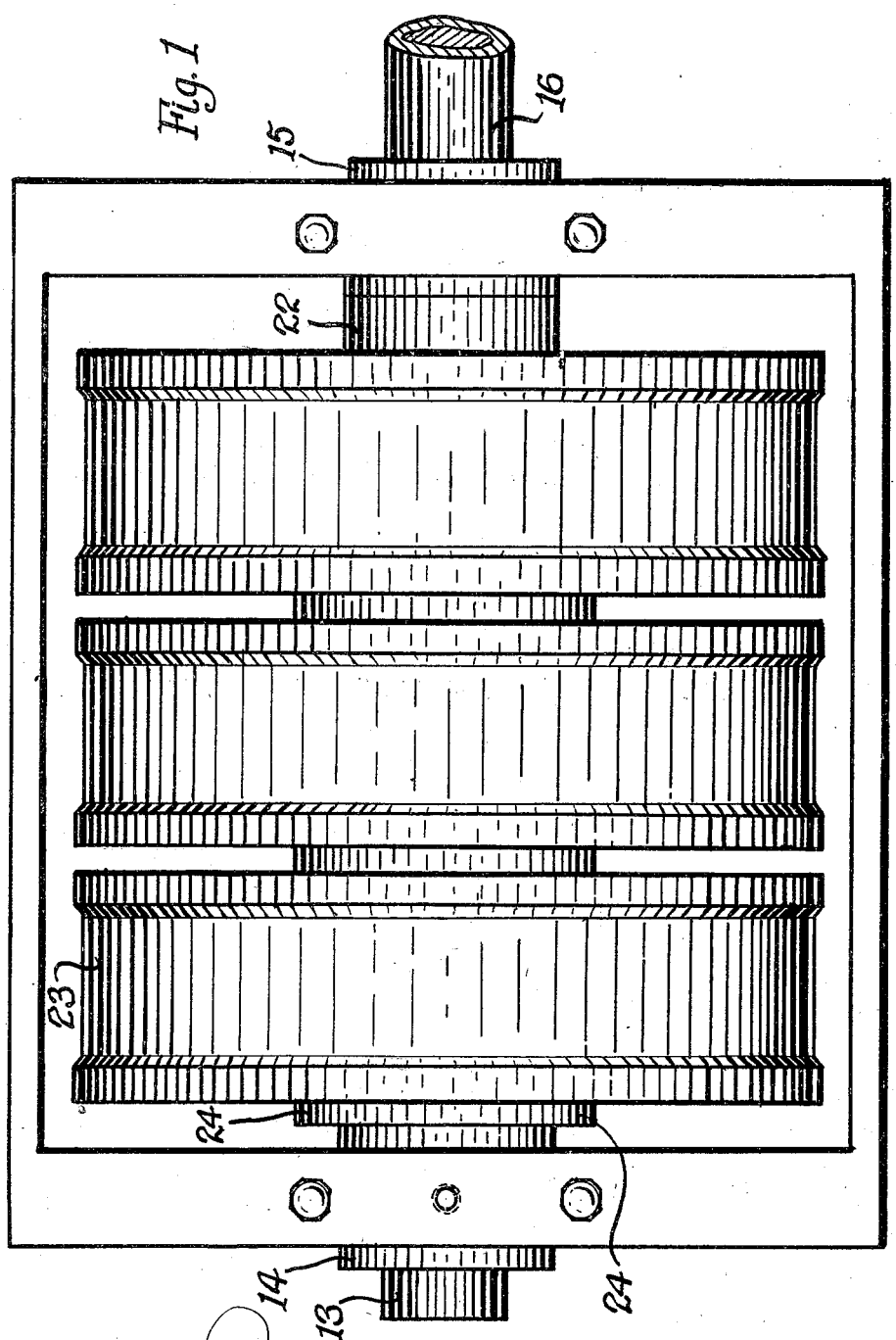
Figure 1 is a plan view of a transmission constructed in accordance with my invention, showing three planetary trains in their proper relation to each other, the brake bands being removed.
Figure 2:
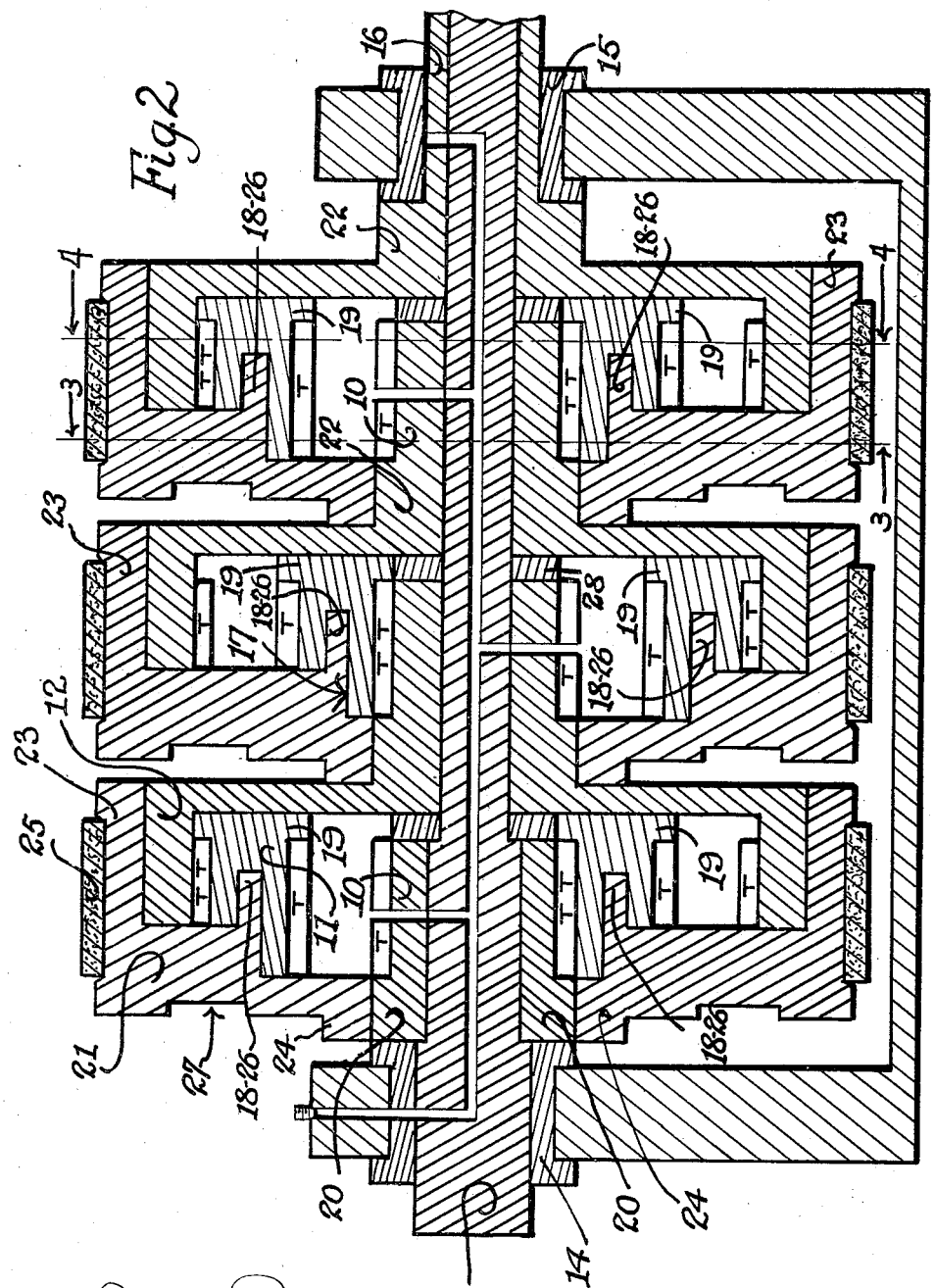
Figure 2 is a longitudinal view therethrough.
Figure 3:
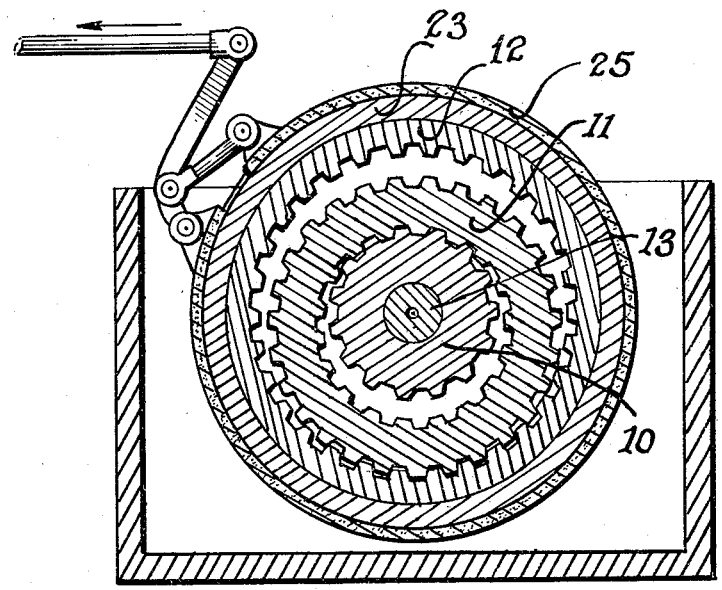
Figure 3 is a section on the line 3—3 of one of the planetary trains.
Figure 4:
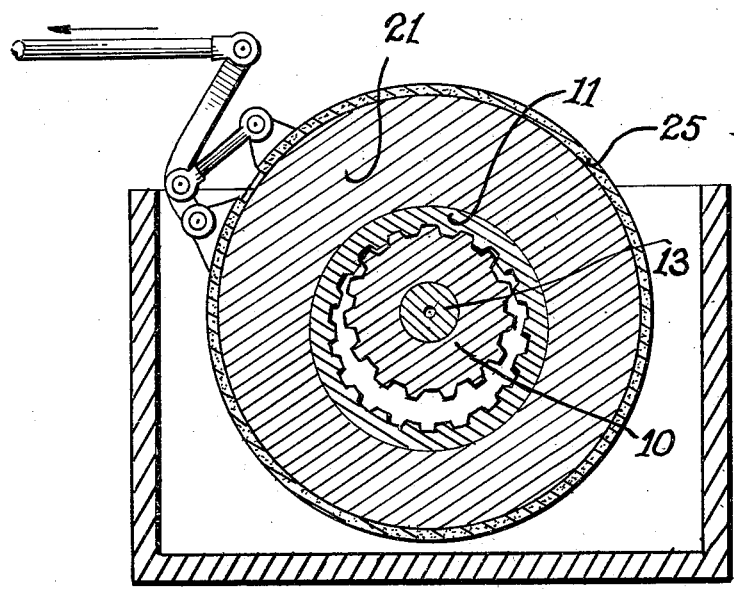
Figure 4 is a section on the line 4—4 of one of the planetary trains.

Referring now more particularly to the drawings the numerals 10, 11, and 12 indicate respectively the sun gear, the annular compound planet gear, and the orbit gear in each of the planetary trains above referred to.

Shaft 13 is mounted in the bearing 14 at one end and its opposite end has a bearing in the sleeve 16, which in turn is mounted in bearing 15. Shaft 13 has no permanent driving connection to any of the elements of the several trains except the initial train but serves as a mounting for the orbit gear of the initial train and all the other trains.

The hub of the orbit gear 12 of the last of the series of planetary trains, at the right, or of the planetary train when only one train is used, forms a sleeve 16 which is mounted in and protrudes through bearing 15 and to which is to be connected the driven element.

In accordance with my invention the compound annular planet gear 11 is provided with a deep recess 18 between the inner and outer gear teeth the purpose of which is to receive a flange of the guide member, thus forming a bearing connection as will hereinafter more fully appear. On the opposite side of gear 11, I have provided a protuberance which is formed by using a blank in the manufacture of said gear 11, wider than the face of the gear teeth, the purpose of this protuberance being to give strength to the gear, or, if the recess is as deeply cut as the teeth faces, so that the gear will not be severed.

A compound guide member is provided, comprising a disc 21 which has a hub 24 to form a bearing with hub 20 of the first planetary train and the similar element 22 in succeeding trains, said guide members 21 being mounted concentrically with sun gear 10 and orbit gear 12. Said guide member 21 is also provided with a circular flange 26 eccentrically disposed to the hub 24, the offset being the same as the offset of gear 11 when in its proper relation to and in mesh with gears 10 and 12, the purpose of this flange being to form a bearing in connection with hub 17 and recess 18 as will hereinafter more fully appear.

Compound guide member 21 is also provided with a peripheral flange 23, the inner face of which forms a bearing connection with the outer surface of orbit gear 12, on a plane therewith. Upon the outer surface of the peripheral flange 23 is formed a brake drum. A brake 25 may be associated with this flange to hold the compound guide member against rotation.

It will be obvious that when brake 25 is applied and rotation of disc 21 is held against rotation, planetary action will take place.

Compound guide member 21 is cut away as indicated at 27 to decrease weight and, primarily, to counterbalance the gear train and associated elements.

In order to show my invention in as simple a manner as possible, plain bearing connections are shown in the drawings and description throughout. It will be obvious that anti-friction bearings may be provided in every instance without in any way departing from the spirit of my invention.

Since the construction herein illustrated and described is capable of a very considerable range of change and modification without in any manner departing from the spirit of the invention, I accordingly do not limit myself to such specific structure except as hereinafter claimed.

I claim:—

1. In a planetary eccentric transmission and in combination with sun and orbit gears, an annular compound planet gear internally toothed for co-action with said sun gear and externally toothed for co-action with said orbit gear, deeply recessed on one side, between its inner and outer gear teeth faces for co-action with a guide member and to form a bearing connection therewith in a plane with said sun and orbit gears; said annular compound gear having on the side opposite from said recess a protuberance so that the gear will not be severed when said recess is as deeply cut as the gear teeth faces, and to give the gear necessary strength.

2. In a planetary eccentric transmission and in combination with sun and orbit gears and a compound annular planet gear internally toothed for co-action with said sun gear and externally toothed for co-action with said orbit gear, and deeply recessed on one side between its inner and outer gear teeth faces, a compound guide member consisting of a disc having a hub on one side concentrically disposed to and forming a bearing connection with the drive shaft of the gear train; said guide member also having on its opposite side a peripheral flange concentrically disposed to said hub and fitting over said orbit gear and forming a bearing connection therewith on a plane with said orbit gear; said compound guide member also having another circular flange on the same side as said peripheral flange, eccentrically disposed as to said hub and peripheral flange and of such diameter as to fit into the recess in said annular compound planet gear, with which it forms a bearing connection on a plane therewith and on a plane with the said sun and orbit gears.

ELMER L. ENGELHARDT.